Sept. 13, 1927.
L. W. BUGBEE
1,642,575
MEANS FOR MARKING A TORIC LENS AXIS
Filed April 3, 1923
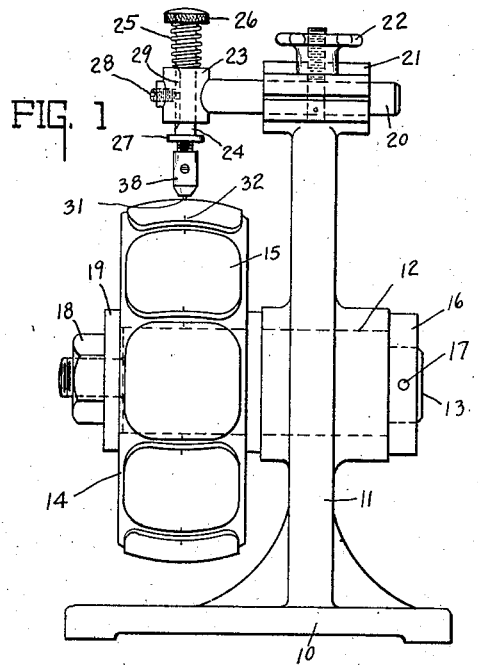
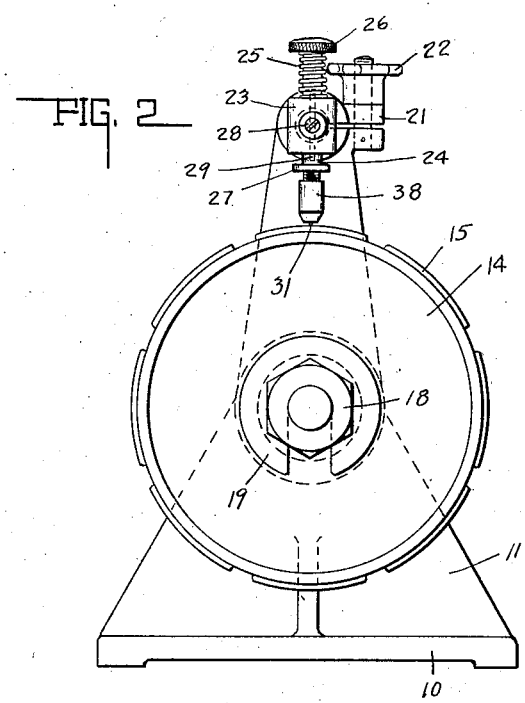
INVENTOR.
LUCIAN W. BUGBEE.
BY
ATTORNEYS.

Patented Sept. 13, 1927.

1,642,575

UNITED STATES PATENT OFFICE.

LUCIAN W. BUGBEE, OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

MEANS FOR MARKING A TORIC-LENS AXIS.

Application filed April 3, 1923. Serial No. 629,735.

The object of this invention is to effect the accurate marking of the axes of toric and like lenses. The method heretofore employed, which has been called the "light method", used when the lens is finished, has not been accurate for obvious reasons. When the blank was semi-finished, some sort of disassociated measuring means has been required.

The chief feature of this invention consists in locating the axis of the lens from the lens holder on which it is ground or polished or from indications thereon and this becomes absolutely accurate, because there is a necessary agreement, brought about by the grinding and polishing of the lenses, between the axes thereof and some indicating part of or means on the lens holder. Another feature is the application of a marker that is held in certain relation to the lens holder on which it is ground or polished or indicating means thereon for the accurate marking of the axes of the toric lenses.

Various means may be employed for accomplishing the object of this invention. One form of such means consists in mounting a marker adjustable in certain relation to a spotting wheel on which the lenses are held while they were being ground or treated, whereby the equatorial axes or the axes in the equatorial line of the lenses are caused to agree with the equatorial line or diameter of the spotting wheel. In making these lenses the surface of the holder is spherical and is substantially the same curvature as the base curve of the lenses, and it is customary for the equatorial line of the grinder and the lens holder to agree and also to be substantially midway between the sides of the holder, although this latter feature is not necessary. Therefore the equatorial line of the lens when ground will necessarily be in agreement with the equatorial line of the lens holder. In this way the equatorial axes of a plurality of lenses can be accurately marked and be free from all errors arising from the usual method and means for marking the axes of said lenses.

The full nature of the invention will be understood from the accompanying drawings and the following description and claims:

In the drawings, Figure 1 is an elevation of one form of machine for marking toric lenses, when they are mounted on a spotting wheel or like holder. Fig. 2 is an end elevation of Fig. 1.

The process here involved for the accurate marking of the axes of toric lenses and especially the equatorial axes thereof, consists in utilizing the means on which the toric lenses are mounted while the lens was being ground, the lens holder and support, for indicating the axes of the toric lenses to be marked; and the further step in the process of marking the axes of the toric lenses by means held in fixed relation with such lens holder or support. Such process will be understood from the following explanation of the drawings herein, showing three means for carrying out said process.

In the device shown in Figs. 1 and 2, there is a frame consisting of a base support 10 and an upright 11 secured thereto integral in the drawings, but the manner of securing them together is immaterial. The upright has a bearing 12 for an arbor 13 mounted therein, adapted to receive a spotting wheel 14 with a transversely curved periphery on which a number of toric lens blanks 15 are secured. The main portion of the arbor 13 is substantially of the same dimensions as the bearing 12, as shown by dotted lines in Fig. 1. The ends of the arbor are reduced, as shown. A collar 16 is held by a screw 17 on one reduced end of the arbor and a nut 18 screws on the other reduced end of the arbor against a washer 19 that engages the hub of the spotting wheel.

The lens holder surface of the spotting wheel is spherical and has substantially the same curvature as the base curve of the lenses, as shown. The equatorial curvature of the lens is determined by the circumferential curvature of the spotting wheel, while the meridional curvature is determined by the transverse curvature of the grinder, not shown, and the equatorial axes of the lenses or the axes in the equatorial line thereof are determined by the grinder and lens holder but when arranged in a customary manner as stated, it is substantially midway between the sides of the holder and coincides with the equatorial lines of the holder.

After the blanks for the toric lenses have been secured by cement, not shown, on the spotting wheel and ground by a grinder, not shown, the spotting wheel is removed with the lenses still thereon and placed in the marking device so that it can be rotated by hand.

The marker is mounted on the upper end of the upright 11 by means of an arm 20 being clamped in a split bearing 21 that is clamped by a nut 22. The arm 20 has a head 23 on it with a vertical hole through it for a marker rod 24 which is vertically reciprocable therein and is forced upward by a spring 25 surrounding said rod and lying between the head 23 and a knob 26 on the upper end of the rod 24. A collar 27, on the lower part of the rod 24, limits the upward movement by engaging the head 23. When the rod 24 is not pressed downward, the collar 27 rests against the head 23. In the drawings, the rod 24 is shown in this position when it is pressed downward. The rod 24 is held from turning by a pin 28 that projects into a vertical groove 29, shown by dotted lines in Fig. 1. The lower end of the rod 24 is threaded to receive a holder 38 for a diamond 31 which does the marking when it is pressed downward, as shown in the drawings.

The marker is adjustable, by the means above described, laterally of the spotting wheel and lenses and it is set so that the axis of the marker rod 24, and the diamond, will correspond with the equatorial diameter of the spotting wheel and lenses. This equatorial diameter lies midway between the sides of the spotting wheel, and, therefore, the axes of the lenses can be accurately marked, as shown by the marks 32 thereon. This line bounds the plane of greatest diameter through the wheel. The line also registers with the optical centers of the series of lenses. The optical centers, like the equatorial axes of the lenses, are mechanically determined by the wheel and grinder, and not by the operator, and of necessity agree with the equatorial line of the wheel. The optical centers, as well as the equatorial axes, are at the thickest part of the lenses. Thus, as seen in Fig. 1, the marker is set to touch the highest or outermost point of the lens, and which, if the wheel be true, is substantially midway between the sides thereof. With toric lenses thus formed on the spotting wheel and kept thereon until marked, the operator has no difficulty in locating the equatorial axis because it agrees with the corresponding axis of the wheel and the optical centers of the lenses.

The invention claimed is:

1. Means for marking toric and like lenses, including a spotting wheel having a transversely curved peripheral surface on which the lenses are secured with their base curves adjacent the spotting wheel, means for rotatively supporting said wheel, a lens marker, means on which the marker is mounted adjacent the periphery of the spotting wheel, and means for supporting said marker carrying means which latter means is movable radially of the wheel towards and from the same in a line that will intersect the equatorial line of the wheel.

2. Means for marking toric and like lenses including a spotting wheel having a transversely curved peripheral surface on which the lenses are secured with their base curves adjacent the spotting wheel, an arbor for rotatively supporting said wheel, a marker frame mounted rigidly in relation to said wheel arbor and extending perpendicular therefrom, a marker holder movably mounted in said frame so as to be moved for adjustment in a line parallel with the axis of the wheel arbor, and a marker mounted on said marker holder which extends and is movable radially of the wheel and towards and from the same in a line that intersects the equatorial line of the wheel.

3. Means for marking toric and like lenses including a frame, an arbor mounted in said frame, a spotting wheel rotatively mounted on the arbor and having a transversely curved spherical surface on which the lenses are secured with their base curves adjacent the spotting wheel, a lens marker arbor mounted in said frame so as to be moved for adjustment in a line parallel to the axis of the wheel arbor, a lens marker carried by said lens marker arbor and extending radially of the wheel and movable towards the same in a line that intersects the equatorial line of the wheel, and a spring for retracting said marker from the wheel after the marker has been operated.

In witness whereof, I have hereunto affixed my signature.

LUCIAN W. BUGBEE.